United States Patent [19]

Takase

[11] Patent Number: 5,448,245

[45] Date of Patent: Sep. 5, 1995

[54] SIGNAL PROCESSING APPARATUS IN RADAR

[75] Inventor: Masaya Takase, Hyogo, Japan

[73] Assignee: Mitsubishi Denki Kabushiki Kaisha, Tokyo, Japan

[21] Appl. No.: 180,354

[22] Filed: Jan. 12, 1994

[30] Foreign Application Priority Data

Feb. 8, 1993 [JP] Japan .................. 5-041796

[51] Int. Cl.⁶ ............... G01S 13/526; G01S 13/53; G01S 13/534
[52] U.S. Cl. ................. 342/195; 342/160; 342/162; 342/196; 342/204
[58] Field of Search ............. 342/195, 160, 161, 162, 342/196, 135, 204, 91, 115

[56] References Cited

U.S. PATENT DOCUMENTS

| 4,057,800 | 11/1977 | Ganz | 342/116 |
| 4,222,050 | 9/1980 | Kiuchi | 342/162 |
| 4,654,665 | 3/1987 | Kiuchi et al. | 342/160 |
| 5,200,755 | 4/1993 | Matsuda et al. | 342/158 |
| 5,235,338 | 8/1993 | Hsiao et al. | 342/109 |

FOREIGN PATENT DOCUMENTS 4235407 8/1992 Japan .

Primary Examiner—John B. Sotomayor
Attorney, Agent, or Firm—Rothwell, Figg, Ernst & Kurz

[57] ABSTRACT

The present invention relates to a signal processing apparatus for use in radars, which can detect a target from a receive signal by digital processing. An A-D converter samples the receive signal by a clock signal A, and quantizes the sampled value. A clock accelerator generates a clock signal B having a frequency which is N times a frequency of the clock signal A. A signal latch holds an output from the A-D converter for an N clock period of the clock signal B. A digital low-pass filter performs low-pass filtering processing with respect to an output from the signal latch with the clock signal B as an operating clock. As a result, an output from the digital low-pass filter includes a more approximate value of the maximum value in the receive signals. Therefore, it is possible to provide improved accuracy of the target detection by a target detector.

8 Claims, 15 Drawing Sheets

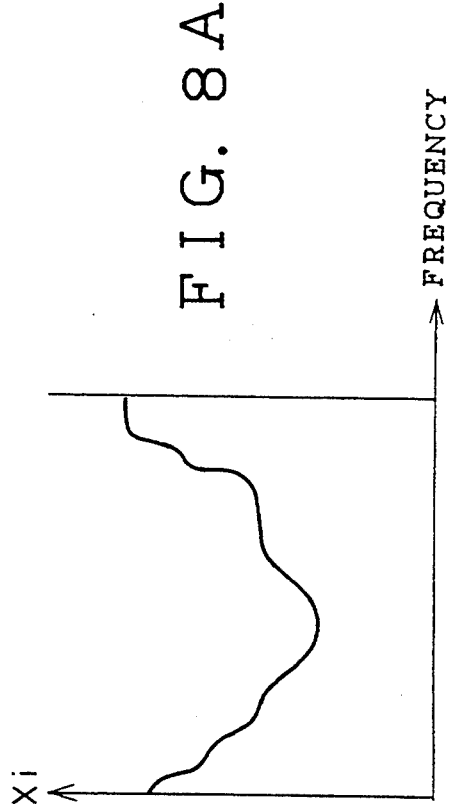
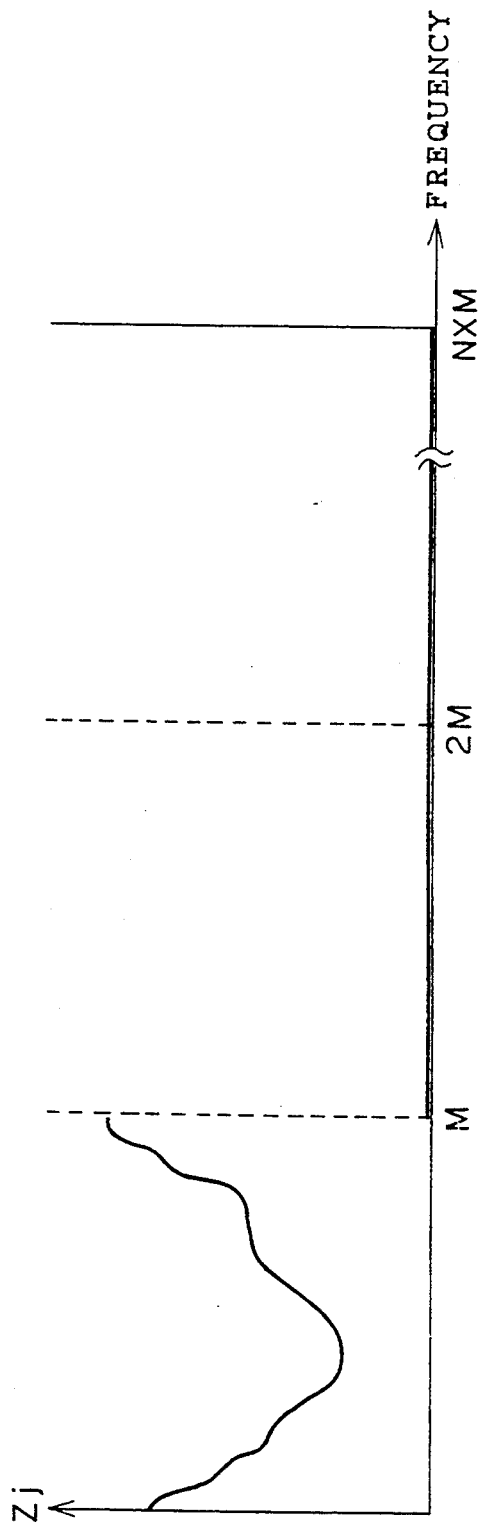

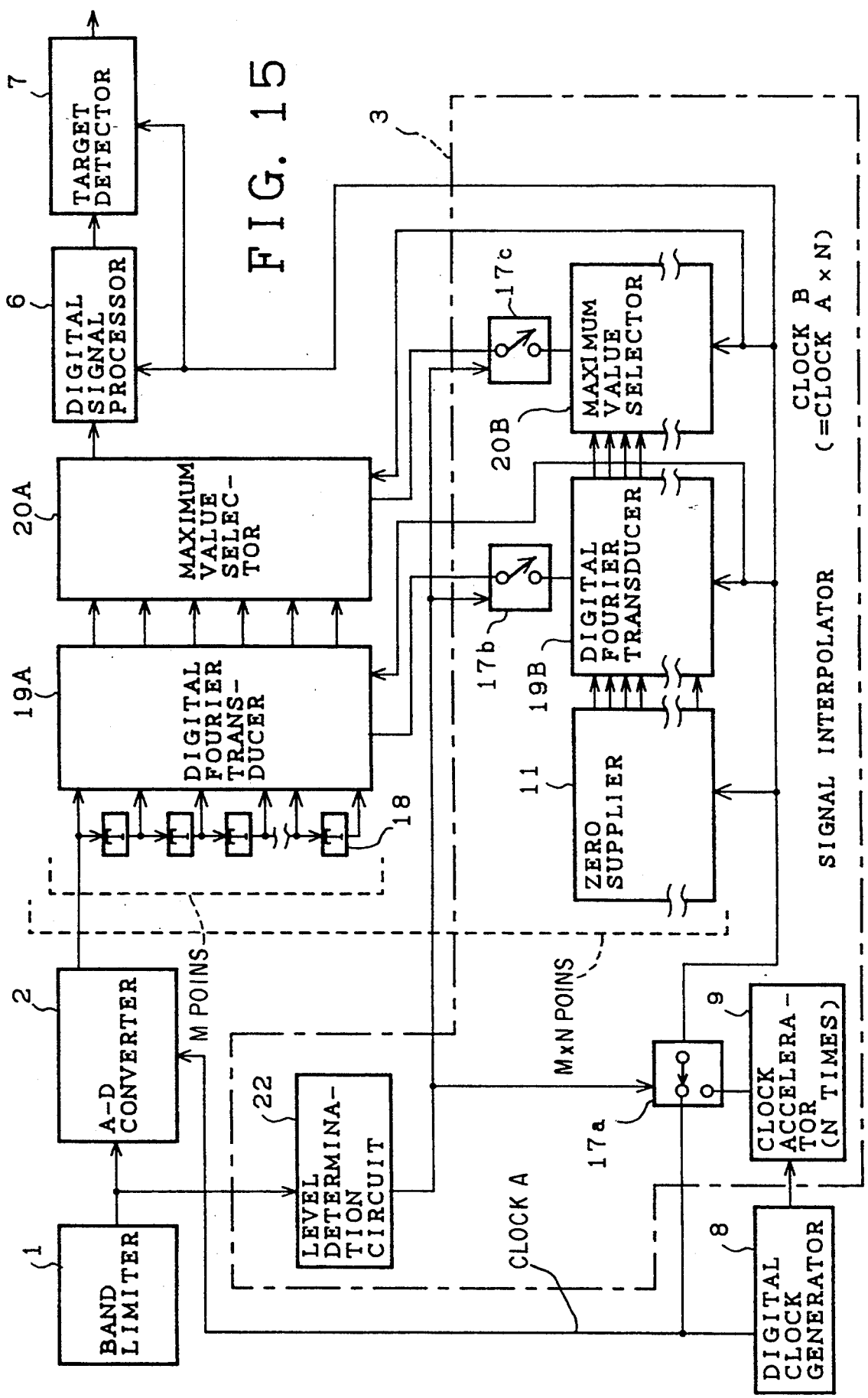

SIGNAL PROCESSING APPARATUS IN RADAR

BACKGROUND OF THE INVENTION

1. Field of the Invention

The present invention relates to an apparatus to detect a target in a radar, in particular relates to a signal processing apparatus in the radar which achieves the object by digital signal processing.

2. Description of the Prior Art

FIG. 1 is a block diagram showing signal processing in a signal processing apparatus in a conventional radar which performs the signal processing in a digital format, and the block diagram is disclosed in, for example, Radar Techniques, 5th ed. (The Institute of Electronics, Information and Communication Engineers), FIG. 3.11, at p.79.

In FIG. 1, reference numeral 1 means a band limiter, 2 means an A-D converter, 6A is a digital signal processor to perform, for example, MTI processing for reducing a reflected wave from fixed objects, and detecting only a moving target, 7 is a target detector, and 8 is a digital clock generator to feed a clock to digital circuits.

FIG. 2 is an explanatory view of an operation of the A-D converter 2, which is disclosed in FIG. 3.12 of the above reference. In FIG. 2, u and $x_i$ (i=1, 2, 3 ... 7) are an input signal and an output signal of the A-D converter 2, respectively.

A description will now be given of the operation. In typical signal processing apparatus in the radar, since a narrow pulse is transmitted or pulse compression processing is performed so as to provide desired range resolution, a receive pulse has a sharp and narrow shape as shown by u in FIG. 2.

When the sharp and narrow receive pulse is quantized by the A-D converter 2 in the signal processing apparatus in the conventional radar, it is possible to provide a value shown by $x_i$ of FIG. 2. However, a time to perform the quantization is provided at intervals on a time base, and a relative position between a quantization point and a radar receive signal is not predetermined. Hence, it is not always possible to quantize the maximum value of the radar receive signal.

On the other hand, the target detector 7 has to detect the maximum value of the radar receive signal. However, in a characteristic of the conventional radar signal processing, the maximum value of the radar receive signal can not be quantized by the A-D converter 2, resulting in loss in signal detection.

There is an available technique to widen receive pulse to be quantized in order to easily quantize the maximum of the radar receive signal. However, it is impossible to provide the desired range resolution in the wide receive pulse. Hence, the A-D converter 2 is operated at a high speed so as to quantize an approximate value of the maximum value of the receive pulse for the purpose of reduction of the quantization loss. In this case, in order to correctly quantize the receive signal, the band limiter 1 limits a band of the receive signal within Nyquist frequency on the basis of the sampling theorem on the preceding stage of the A-D conversion. However, in view of implementation of devices, the high speed operation of the A-D converter 2 is limited so that the reduction of the quantization loss is also limited.

As set forth above, the signal processing apparatus in the conventional radar can not always quantize the maximum value of the radar receive signal. Thus, there is a problem in that the quantization loss occurs.

A signal processing circuit to perform conventional pulse doppler type MTI processing is disclosed in, for example, Radar Handbook, 2d ed. (McGraw Hill), FIG. 15.6 (at p.15.5) and p.15.34. FIG. 3 is a block diagram showing the pulse doppler type MTI circuit. In FIG. 3, component parts identical with or equivalent to those in FIG. 1 are designated by the same reference numerals, and descriptions thereof are omitted.

In FIG. 3, reference numeral 18 means a hit interval delayer to perform time delay for each pulse repetition period: T, 19A means a digital Fourier transducer, and 20A is a maximum value selector to select the maximum value in each output from the digital Fourier transducer 19A.

In the pulse doppler type MTI circuit, the A-D converter 2 performs A-D conversion of output from the band limiter 1. The hit interval delayer 18 performs the time delay to the resultant output obtained by the A-D conversion for each pulse repetition period: T. The digital Fourier transducer 19A performs the Fourier transform to each radar receive signal of each hit having the same range arranged in parallel to each other. Further, the maximum value selector 20A selects the maximum value in the respective outputs from the digital Fourier transducer 19A to feed the value to the digital signal processor 6A.

In this case, a characteristic of each filter bank of the digital Fourier transducer 19A is shown by $V_i$ in FIG. 4, and an output from the signal processing apparatus is shown by $S_v$ for example. However, there is another problem in that $S_v/V_i$ to a target signal does not always become the maximum value in the pulse doppler type MTI circuit.

SUMMARY OF THE INVENTION

The present invention is made to overcome problems as set forth above. It is an object of the present invention to provide a signal processing apparatus in a radar, which can reduce a quantization loss of a radar receive signal without a higher speed operation of an A-D converter.

It is another object of the present invention to provide a signal processing apparatus in a radar, which can reduce a quantization loss of a radar receive signal without a higher speed operation of an A-D converter, and can reduce a load at a time of processing of the radar receive signal when a receive level of the radar receive signal is a sufficiently large.

According to the first aspect of the present invention, for achieving the above-mentioned objects, there is provided a signal processing apparatus in a radar, including a signal interpolator having a clock accelerator to generate a second clock signal having a frequency given by integral multiples (N times) of a frequency of a first clock signal, a signal latch to hold a value of the radar receive signal which is sampled at a period of the first clock signal while N second clock signals are output, and a digital low-pass filter operated by the second clock signal to limit the frequency so as to pass only a signal having frequency no more than Nyquist frequency in the held signals.

In the signal processing apparatus according to the first aspect of the present invention, the signal latch and the digital low-pass filter interpolate a signal at a quantization interval by the first clock signal. Further, each digital processing circuit subsequent to the digital low-pass filter is operated by the second clock signal. In the processing, it is possible to considerably reduce a time quantization loss without a high speed operation of the A-D converter. An output from the A-D converter previously holds all frequency information on the basis of the sampling theorem. Therefore, it is possible to perform the signal interpolation at the quantization interval.

According to the second aspect of the present invention, there is provided a signal processing apparatus in a radar including the above configuration, and further including a clock signal changing switch to cause a clock signal fed to a digital low-pass filter to be switched, a bypass changing switch to bypass a signal latch and the digital low-pass filter, and a level determination circuit to perform switching control of the clock signal changing switch and the bypass changing switch according to a receive level of a radar receive signal.

In the signal processing apparatus according to the second aspect of the present invention, the level determination circuit detects the receive level of the radar receive signal. In case the receive level of the radar receive signal is sufficiently large, an operating clock is switched over to the first clock signal so as to reduce a load at a time of processing of the radar receive signal.

According to the third aspect of the present invention, there is provided a signal processing apparatus in a radar, including a signal interpolator having a clock accelerator to generate a second clock signal having a frequency which is N times a frequency of a first clock signal, a digital Fourier transducer operated by the first clock signal to perform the Fourier transform of a radar receive signal which is sampled at a period of the first clock signal, a zero supplier to generate a zero supplementary value by supplementing output from the digital Fourier transducer with a zero value so as to multiple the sampled number by N, and an inverse Fourier transducer operated by the second clock signal to perform the inverse Fourier transform of the zero supplementary value.

In the signal processing apparatus according to the third aspect of the present invention, the inverse Fourier transducer performs the inverse Fourier transform to the zero supplementary value by using the second clock signal so as to restore the zero supplementary value to a signal on a time base. Further, the respective digital processing circuits subsequent to the inverse Fourier transducer are operated by the second clock signal. In the processing, it is possible to considerably reduce a time quantization loss without a high speed operation of the A-D converter. An output from the A-D converter previously holds all frequency information on the basis of the sampling theorem. Therefore, it is possible to perform the signal interpolation at the quantization interval.

According to the fourth aspect of the present invention, there is provided a signal processing apparatus in a radar including the above configuration, and further including a clock signal changing switch to cause an operating clock signal fed to a zero supplier, an inverse Fourier transducer, and a target detector to be switched over to a first clock or a second clock, a bypass changing switch to bypass a digital Fourier transducer, the zero supplier and the inverse Fourier transducer, and a level determination circuit to perform switching control of the clock signal changing switch and the bypass changing switch according to a receive level of a radar receive signal.

In the signal processing apparatus according to the fourth aspect of the present invention, the level determination circuit detects the receive level of the radar receive signal. In case the receive level of the radar receive signal is too weak, an operating clock is switched over to the high speed second clock signal so as to reduce a time quantization loss and improve detection efficiency of a target. In case the receive level of the radar receive signal is sufficiently large, the digital Fourier transducer, the zero supplier and the inverse Fourier transducer are bypassed to detect the target depending upon the first clock signal so as to reduce a burden at a time of processing of the radar receive signal.

According to the fifth aspect of the present invention, there is provided a signal processing apparatus in a radar, employing a digital Fourier transducer, a digital vector multiplier and a digital inverse Fourier transducer in a digital pulse compressor as component parts of a signal interpolator, and including the signal interpolator having a clock magnifier to generate a second clock signal having a frequency which is N times a frequency of a first clock signal, and a zero supplier to generate a zero supplementary value by supplementing output from the digital Fourier transducer with a zero value.

In the signal processing apparatus according to the fifth aspect of the present invention, the digital pulse compressor is combined with the zero supplier. Therefore, it is possible to reduce a quantization loss without increasing an apparatus scale.

According to the sixth aspect of the present invention, there is provided a signal processing apparatus in a radar including a configuration as set forth above, and further including a clock signal changing switch to cause an operating clock signal fed to a zero supplier and a digital inverse Fourier transducer to be switched over to a first clock or a second clock, a bypass changing switch to bypass the zero supplier, and a level determination circuit to perform switching control of the clock signal changing switch and the bypass changing switch according to a receive level of a radar receive signal.

In the signal processing apparatus according to the sixth aspect of the present invention, the level determination circuit detects the receive level of the radar receive signal. In case the receive level of the radar receive signal is too weak, an operating clock is switched over to the high speed second clock signal so as to reduce a time quantization loss and improve detection efficiency of a target. In case the receive level of the radar receive signal is sufficiently large, the zero supplier is bypassed to detect the target depending upon the first clock signal so as to reduce a load at a time of processing of the radar receive signal.

According to the seventh aspect of the present invention, there is provided a signal processing apparatus in a radar including a clock magnifier to generate a second clock signal having a frequency which is N times a frequency of a first clock signal, a zero supplier to generate a zero supplementary value by supplementing output from a hit interval delayer with a zero value so as to multiple the sampled number by N, a digital Fourier transducer operated by the second clock signal to perform the Fourier transform of the zero supplementary value, and a maximum value selector to select the maximum value in each output from the digital Fourier transducer.

In the signal processing apparatus according to the seventh aspect of the present invention, the digital Fourier transducer perform the Fourier transform: M×N by using the second clock signal. Further, the respective digital processing circuits subsequent to the digital Fourier transducer are operated by the second clock signal. In the processing, gain to a target signal in a target detector is increased so that it is possible to reduce a quantization loss.

According to the eighth aspect of the present invention, there is provided a signal processing apparatus in a radar including a configuration as set forth above, and including a clock signal changing switch to cause operating clocks for a digital Fourier transducer, a maximum value selector, a zero supplier, and a target detector to be switched over to a first clock or a second clock, an operation changing switch to switch so as to magnify the number input into the digital Fourier transducer and the maximum value selector by N, and a level determination circuit to perform switching control of the clock signal changing switch and an operation changing switch according to a receive level of a radar receive signal.

In the signal processing apparatus according to the eighth aspect of the present invention, the level determination circuit detects the receive level of the radar receive signal. In case the receive level of the radar receive signal is too weak, the operating clock is switched over to the high speed second clock signal so as to reduce a time quantization loss and improve detection efficiency of a target. In case the receive level of the radar receive signal is sufficiently large, the zero supplier, the digital Fourier transducer, and the maximum value selector are partially removed so as to provide a connecting condition to detect the target using the first clock signal, resulting in a reduced load at a time of processing of the radar receive signal.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

BRIEF DESCRIPTION OF THE DRAWINGS

FIG. 8A is a waveform diagram showing an output from a digital Fourier transducer as an example;

FIG. 8B is a conceptual diagram showing zero supplement of the radar receive signal on a frequency base in the signal processing apparatus in the radar according to the second embodiment of the present invention;

FIG. 15 is a block diagram showing a configuration of a signal processing apparatus in a radar according to the eighth embodiment of the present invention.

DETAILED DESCRIPTION OF THE PREFERRED EMBODIMENTS

Preferred embodiments of the invention will now be described in detail referring to the accompanying drawings.

Embodiment 1

Figure 5:
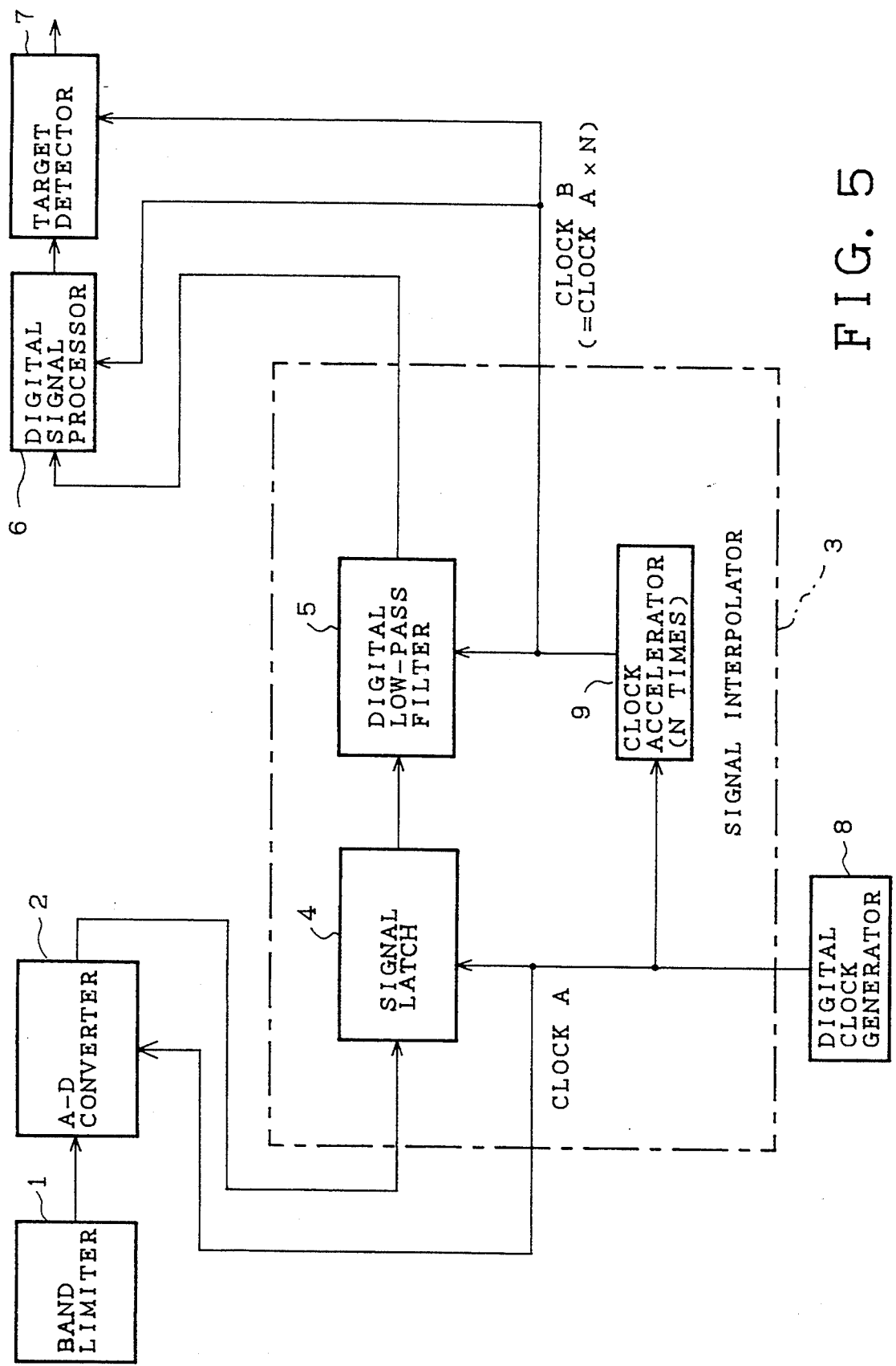
FIG. 5 is a block diagram showing a configuration of a signal processing apparatus in a radar according to the first embodiment of the present invention.

FIG. 5 is a block diagram showing a configuration of a signal processing apparatus in a radar according to the embodiment 1 of the present invention.

In FIG. 5, reference numeral 1 means a band limiter, 2 means an A-D converter, 3 is a signal interpolator to perform interpolation processing of a digitized receive signal, 4 is a signal latch to hold an output from the A-D converter, 5 is a digital low-pass filter to smooth an output from the signal latch 4, 6 is a digital signal processor to perform signal processing such as MTI, 7 is a target detector, 8 is a digital clock generator, and 9 is a clock accelerator to multiple a frequency of a clock generated by the digital clock generator 8 by N (integral times). In the embodiment, the signal interpolator 3 includes the signal latch 4, the digital low-pass filter 5, and clock accelerator 9. Further, the clock accelerator 9 feeds a clock signal B to the digital low-pass filter 5, the digital signal processor 6, and the target detector 7.

A description will now be given of the operation. The band limiter 1 and the A-D converter 2 quantize the radar receive signal whose band is limited on the basis of the sampling theorem. As in the prior art, there are provided quantized output as shown by $x_1$ to $x_7$ in FIG. 2. The signal latch 4 holds each quantized value for one period of a clock signal A. On the other hand, the clock accelerator 9 makes a frequency of the clock signal A higher outputted from the digital clock generator 8 up to N times the frequency of the clock signal A so as to output the clock signal B. Thus, the signal latch 4 can hold one of the quantized values for N clocks of the clock signal B. That is, for one of input values: $x_i$ ($i=1, 2, 3, \ldots$), the signal latch 4 can sequentially output values respectively identical with $x_i$: $y_{j+1}$ to $Y_{j+N}$ in synchronization with the clock signal B according to a relation shown by the expression (1) as follows:

$$y_j = x_{ij} = \begin{pmatrix} N \times (i-1) + 1 \\ N \times (i-1) + 2 \\ \cdot \\ \cdot \\ \cdot \\ N \times (i-1)j + N \end{pmatrix} \quad (1)$$

Figure 6A:
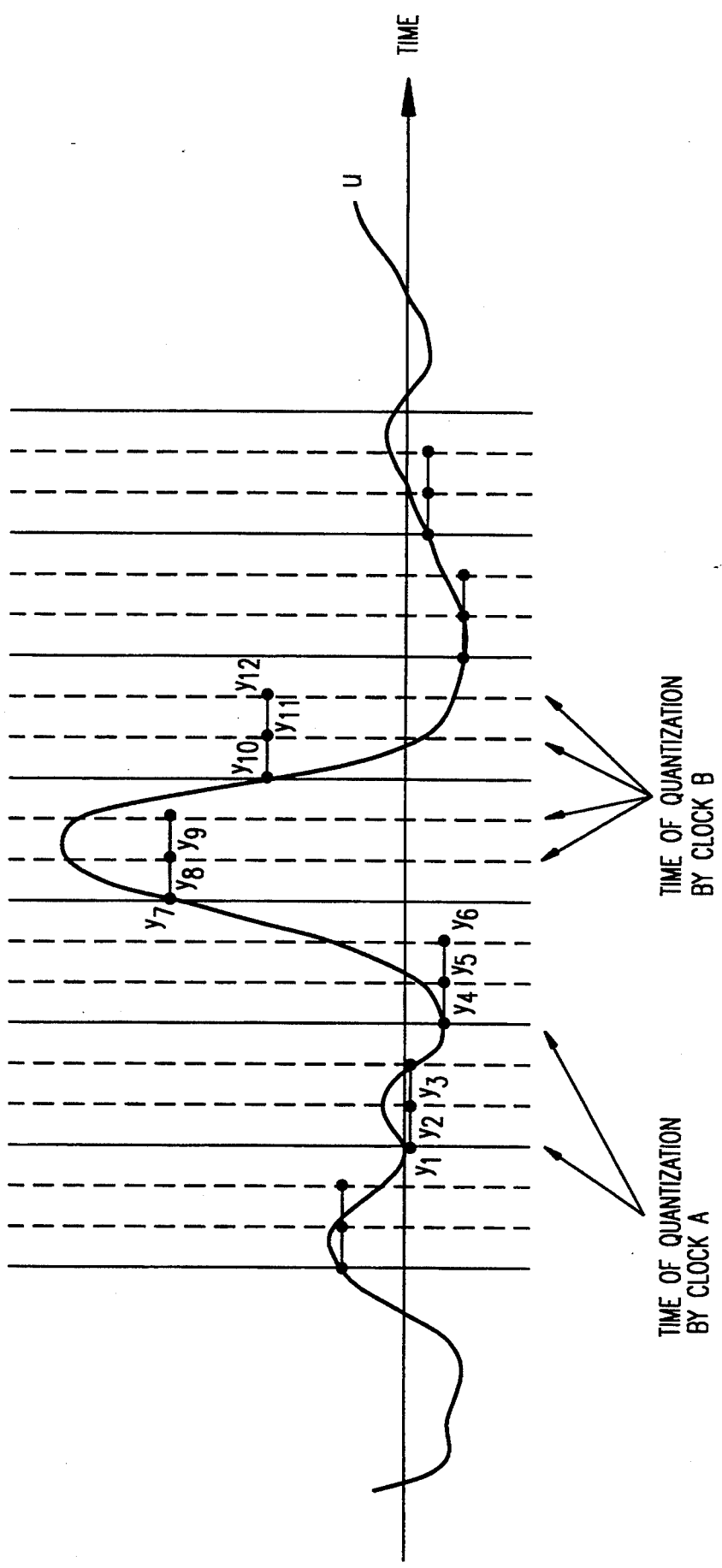
FIG. 6 is a conceptual diagram showing interpolation of the radar receive signal on the time base in the signal processing apparatus in the radar according to the first embodiment of the present invention.

FIG. 6 illustrates the relation when $N=3$.

Figure 2:
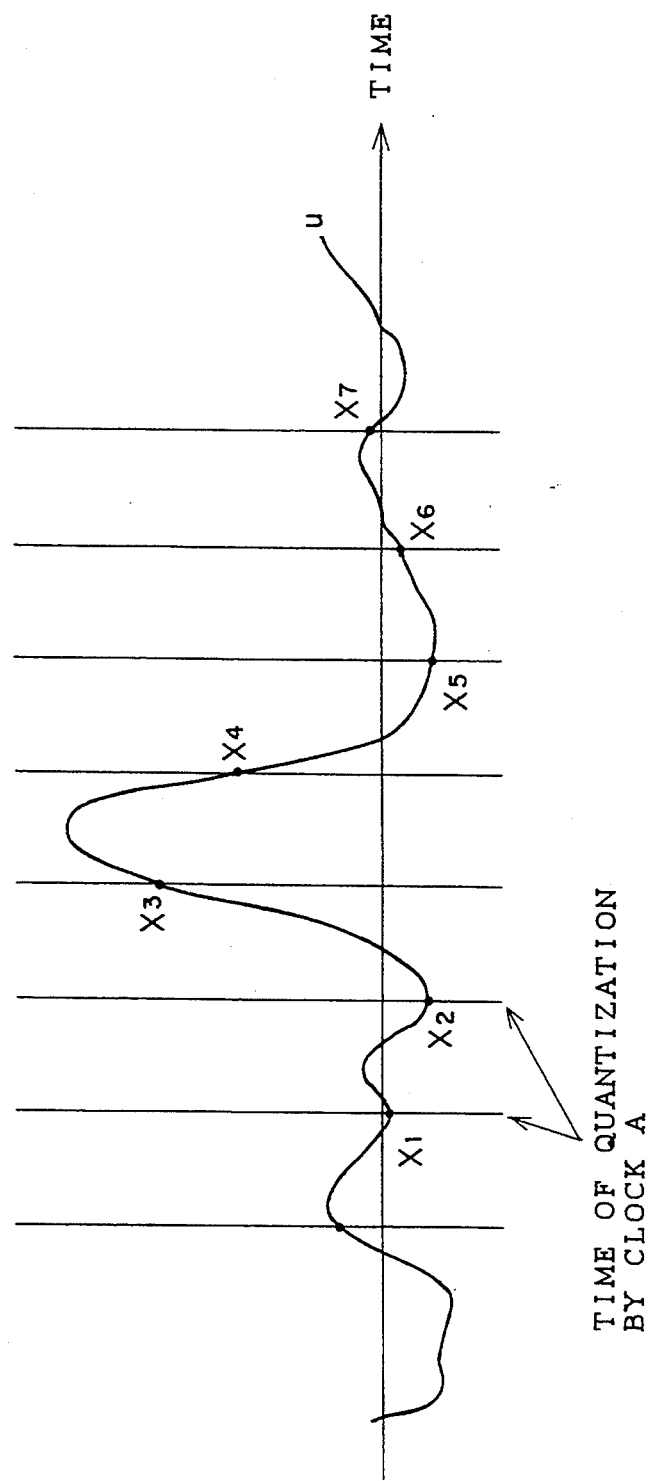
FIG. 2 is a conceptual diagram showing quantization of a radar receive signal on a time base in the signal processing apparatus in the conventional radar.
Figure 6B:
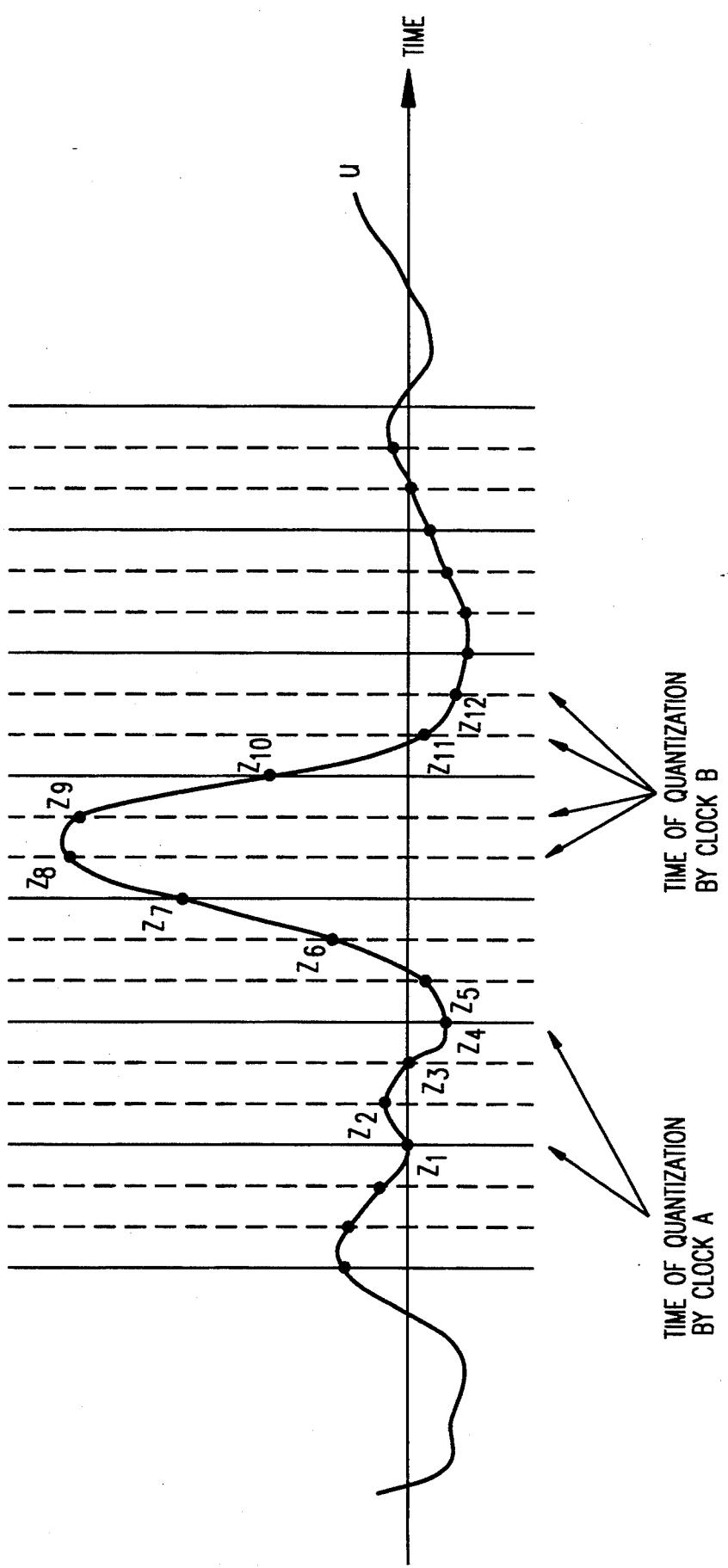

The output $y_j$ of the signal latch 4 passes through the digital low-pass filter 5 which can pass only a signal having a frequency equal to or lower than the Nyquist frequency. Accordingly, a digital signal sequence $Y_j$ is smoothed and converted into a waveform as shown in FIG. 6(b). As shown in FIG. 2, the maximum value in output from the A-D converter 2 is $x_3$. However, output from the digital low-pass filter 5 may include $z_8$, or $z_9$ which is larger than $x_3$. This is because an original band of the radar receive signal is limited by the band limiter 1 within the Nyquist frequency so that interpolation can be performed according to the quantization theorem.

Subsequently, the digital signal processor 6 performs, for example, the MTI processing in the prior art with respect to output from the signal interpolator 3. The target detector 7 detects a target by extracting the maximum value in signals to which the MTI processing or the like is performed. In this case, the maximum value extracted by the target detector 7 is $z_8$ which is far larger than the maximum value $x_a$ (i.e., $z_7$ in FIG. 6(b)) extracted by the target detector 7 of the signal processing apparatus in the conventional radar. That is, a quantization loss can be reduced considerably.

Embodiment 2

Figure 7:
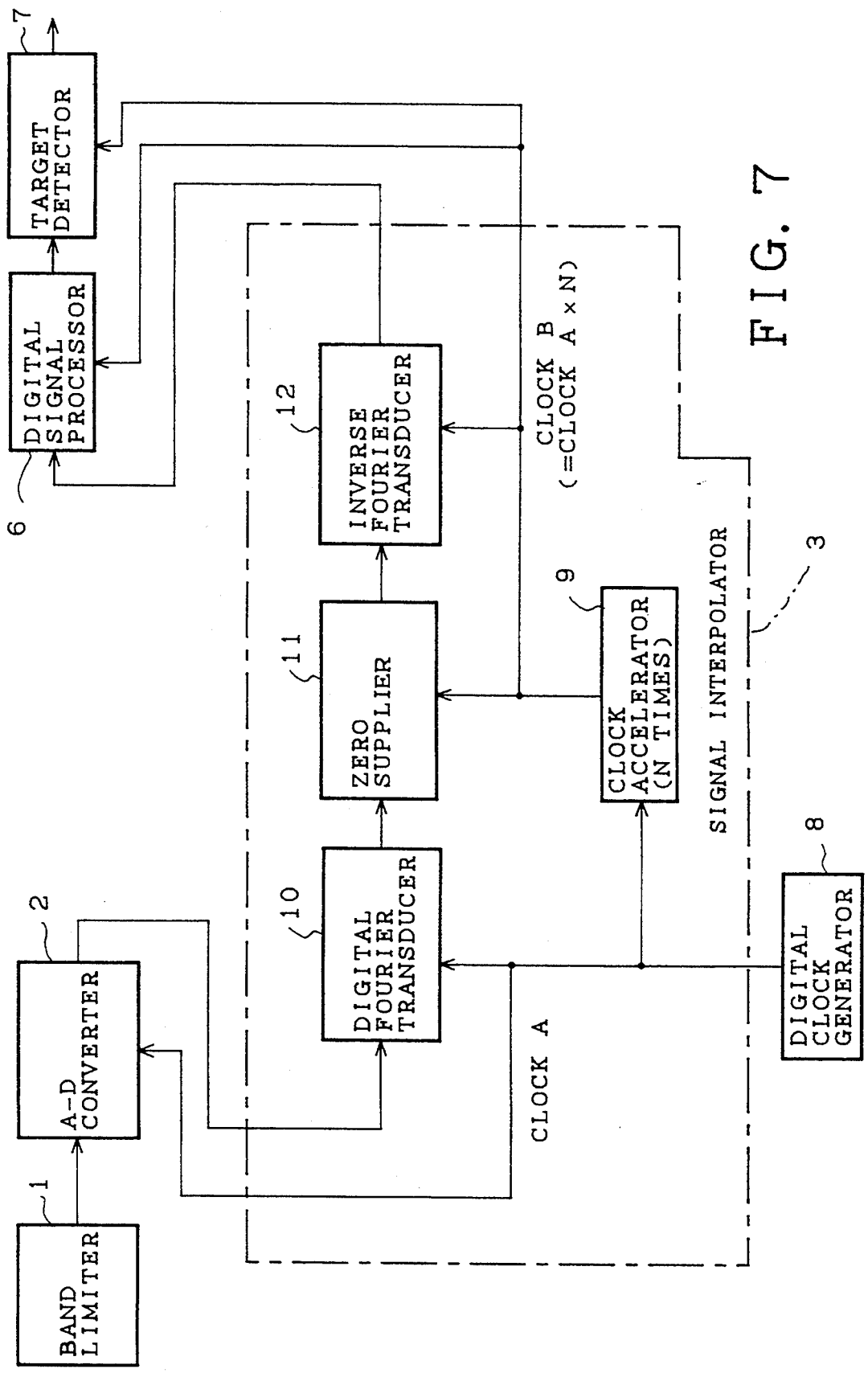
FIG. 7 is a block diagram showing a configuration of a signal processing apparatus in a radar according to the second embodiment of the present invention.

A description will now be given of the embodiment 2 with reference to FIG. 7. In FIG. 7, component parts identical with or equivalent to those in FIG. 5 are designated by the same reference numerals, and descriptions thereof are omitted. While entire interpolation processing is implemented on a time base in the embodiment 1, in the embodiment 2, a signal serving as an object of the interpolation is once transformed onto a frequency base so as to perform the interpolation processing on the frequency base.

In FIG. 7, reference numeral 10 means a digital Fourier transducer to perform the Fourier transform at an M point with respect to output $x_i$ of the A-D converter 2 so as to transform the output $x_i$ into a value $X_i$ on the frequency base, 11 means a zero supplier to supplement output from the digital Fourier transducer 10 with a zero value while extending a frequency range according to the following expression (2), and 12 is an inverse Fourier transducer to transform a zero supplementary value $Z_j$ output from the zero supplier 11 onto the time base again by the inverse Fourier transform at an $N \times M$ point. In this case, the signal interpolator 3 includes the clock accelerator 9, the digital Fourier transducer 10, the zero supplier 11 and the inverse Fourier transducer 12.

$$Z_j = \begin{cases} X_j & (j \leq M) \\ 0 & (j > M) \end{cases} \quad (2)$$

A description will now be given of the operation. The digital Fourier transducer 10 performs the Fourier transform at the M point with respect to the output $x_i$ from the A-D converter 2. For example, there is provided the output from the digital Fourier transducer 10 as shown in FIG. 8A. The zero supplier 11 supplements $x_i$ with the zero value while extending the frequency range according to the expression (2) to generate a zero supplementary value $Z_j$. The clock accelerator 9 creates a clock signal B having a frequency which is N times a frequency of a clock signal A.

Further, the inverse Fourier transducer 12 receives the zero supplementary value $Z_j$ as an input to perform the inverse Fourier transform at the $N \times M$ point by using a clock frequency from the clock accelerator 9. Thereby, the zero supplementary value $Z_j$ is inversely transformed into a signal $z_j$ on the time base.

As a result, it is possible to provide the same interpolation output $z_j$ as shown in FIG. 6(b). The digital signal processor 6 performs, for example, the MTI processing in the prior art with respect to output from the signal interpolator 3. The target detector 7 detects a target by extracting the maximum value in signals to which the MTI processing or the like is performed. In this case, the maximum value extracted by the target detector 7 is far larger than the maximum value extracted by the target detector 7 of the signal processing apparatus in the conventional radar. Therefore, it is possible to considerably reduce a quantization loss as in the embodiment 1.

Embodiment 3

Figure 9:
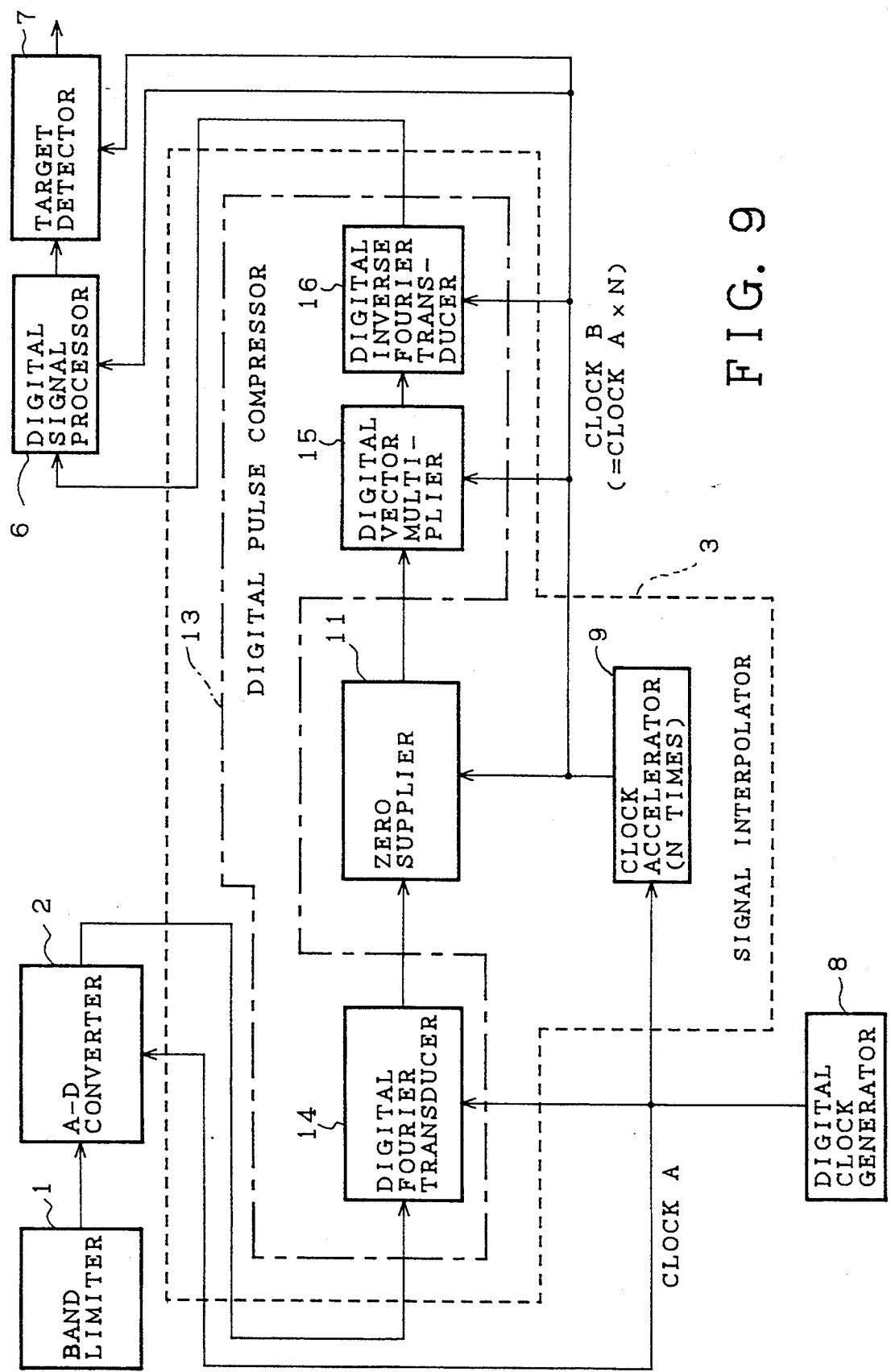
FIG. 9 is a block diagram showing a configuration of a signal processing apparatus in a radar according to the third embodiment of the present invention.

A description will now be given of the embodiment 3 with reference to FIG. 9. In FIG. 9, component parts identical with or equivalent to those in FIG. 7 are designated by the same reference numerals, and descriptions thereof are omitted.

In a radar employing a pulse compression method, there is provided a pulse compression circuit. The pulse compression circuit typically includes a digital Fourier transducer, a digital vector multiplier and an inverse Fourier transducer. Then, it is possible to reduce an increased scale of an apparatus relevant to signal interpolation by employing both component parts of the signal interpolator 3 and component parts of the pulse compression circuit. A signal processing apparatus in a radar according to the embodiment 3 is provided on the basis of such a concept.

In FIG. 9, a digital Fourier transducer 14, a digital vector multiplier 15 and an inverse Fourier transducer 16 serve as component parts of a digital pulse compression circuit 13. Concurrently, the digital Fourier transducer 14, and the inverse Fourier transducer 16 also serve as component parts for signal interpolation.

A description will now be given of the operation. The digital Fourier transducer 14 performs the Fourier transform at an M point with respect to an output $x_i$ from the A-D converter 2. Subsequently, as in the embodiment 2, the zero supplier 11 supplements with a zero value while extending a frequency range by using a clock signal B. The digital vector multiplier 15 performs vector multiplication with respect to output from the zero supplier 11. Thereafter, the inverse Fourier transducer 16 performs the inverse Fourier transform: N×M by using the clock signal B. As set forth above, it is possible to achieve the signal interpolation as well as the pulse compression. Therefore, it is possible to provide an interpolation output $z_j$ as shown in FIG. 6(b), and considerably reduce a time quantization loss.

In this case, for example, the digital Fourier transducer 14 requiring great part of the apparatus scale can be also used as a circuit in the digital pulse compressor 13. Hence, it is possible to considerably reduce the time quantization loss by a slight increase in the apparatus scale.

Embodiment 4

Figure 10:
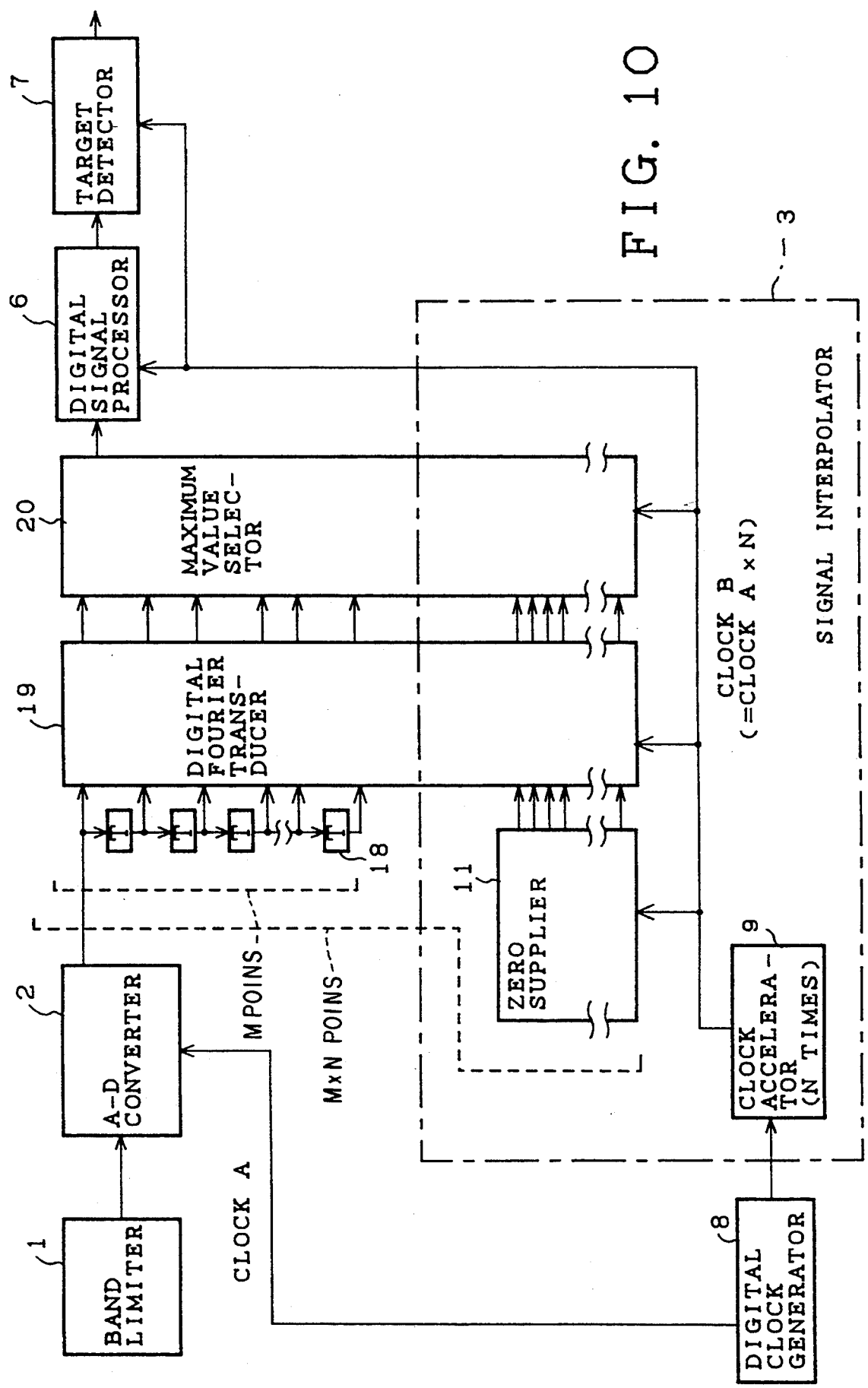
FIG. 10 is a block diagram showing a configuration of a signal processing apparatus in a radar according to the fourth embodiment of the present invention.

A description will now be given of the embodiment 4 with reference to FIG. 10. FIG. 10 is a block diagram showing a configuration of a signal processing apparatus in a radar according to the embodiment 4, in which interpolation is employed in MTI processing serving as hit-to-hit frequency processing so as to provide greater gain to a target signal.

Figure 3:
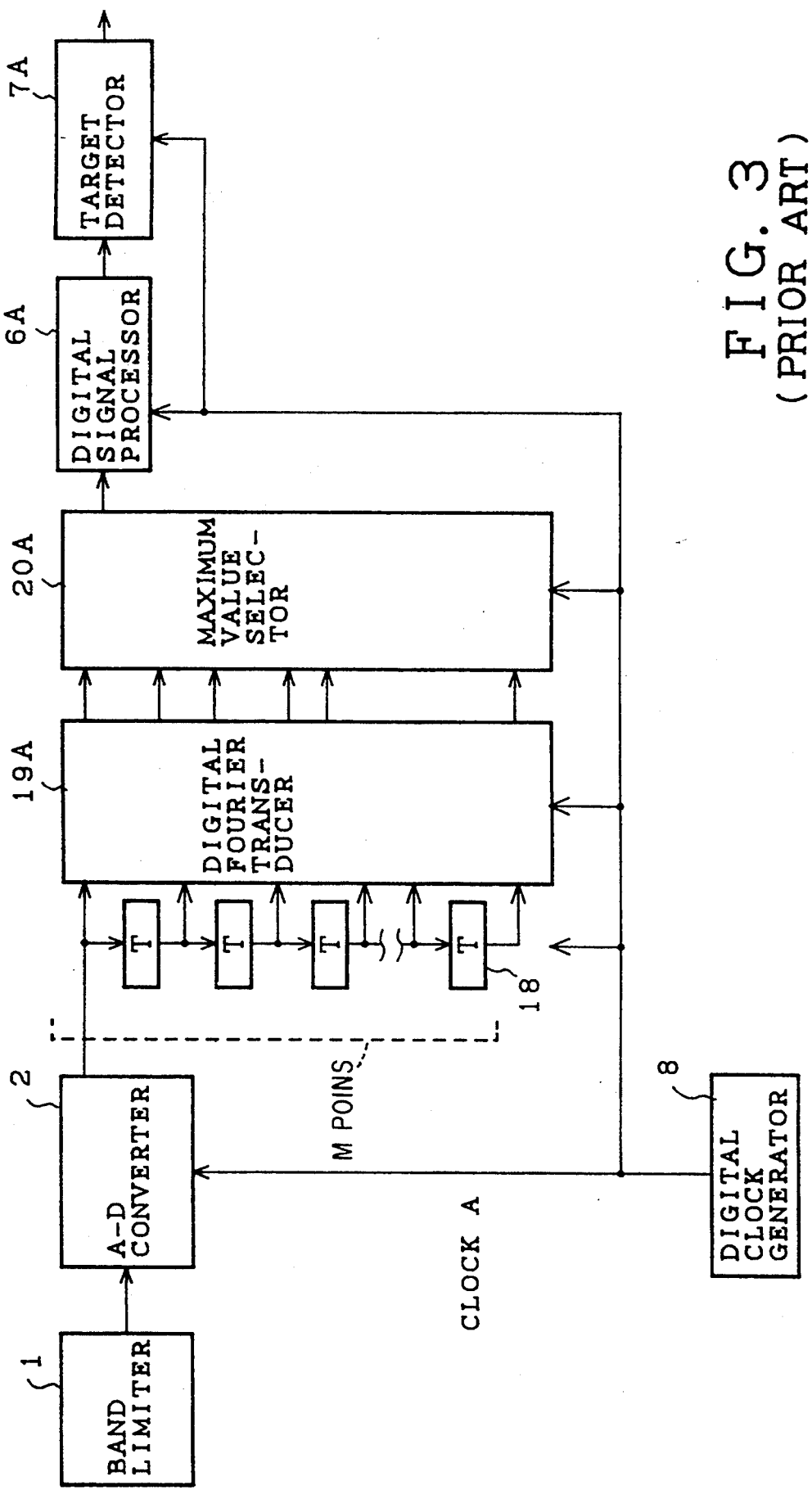
FIG. 3 is a block diagram a configuration of a signal processing apparatus in a radar to perform a conventional digital pulse doppler type MTI processing.

In FIG. 10, component parts identical with or equivalent to those in FIG. 3 are designated by the same reference numerals, and descriptions thereof are omitted. The signal processing apparatus of FIG. 10 has a configuration as shown in FIG. 3, and further includes a signal interpolator 3. The signal interpolator 3 of the embodiment 4 includes a clock accelerator 9 to multiple a frequency of a clock signal A by N, and a zero supplier 11 to perform zero interpolation on a time base.

Figure 11:
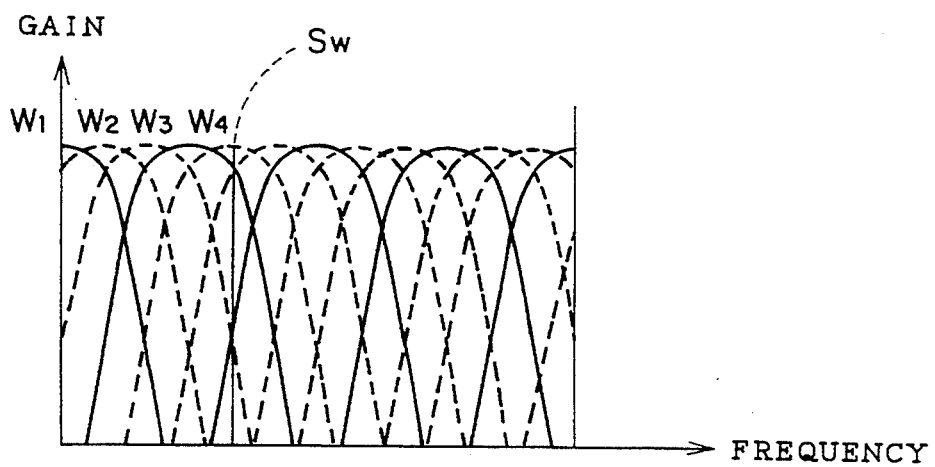
FIG. 11 is a graph showing a characteristic of each filter bank of a digital Fourier transducer and an output from the signal processing apparatus in the radar according to the fourth embodiment of the present invention as an example.

The zero supplier 11 supplements an output from the A-D converter 2 with a zero value while extending a time range on the time base. The digital Fourier transducer 19 performs the Fourier transform at an N×M point with respect to the output from the A-D converter 2 and the supplemented zero value. In the above processing, it is possible to provide a characteristic $w_i$ of each filter bank of the digital Fourier transducer 19 and a receive gain $S_w$ as shown in FIG. 11.

Figure 4:
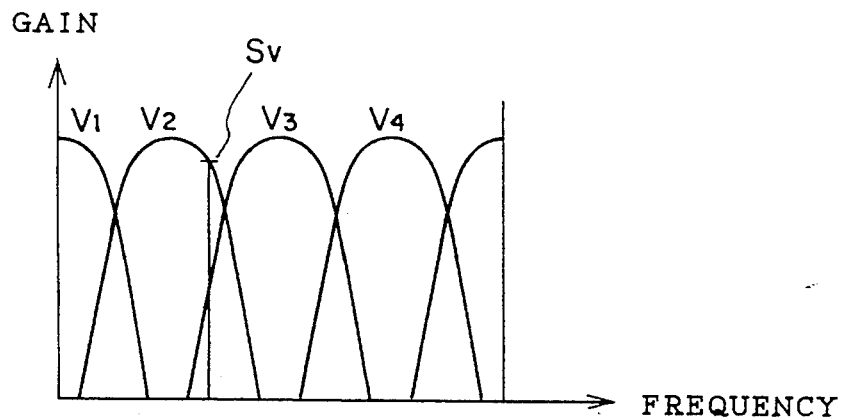
FIG. 4 is a graph showing a characteristic of each filter bank of a digital Fourier transducer and an output from the signal processing apparatus in the radar to perform the conventional digital pulse doppler type MTI processing as an example.

That is, the gain to the target signal can be expressed as $S_w$, and the gain is far greater than conventional gain $S_v$ shown in FIG. 4. That is, it is possible to considerably reduce a time quantization loss.

Embodiment 5

In the embodiments 1 to 4, though it is possible to considerably reduce a time quantization loss, it is essential that the digital low-pass filter 5, the digital signal processor 6, the target detector 7, the zero supplier 11, the inverse Fourier transducer 12 or 16, the digital Fourier transducer 10, 14 or 19, and the maximum value selector 20 which are driven by the clock signal B can be operated N times faster than those which would be driven by the clock signal A.

However, intensity of a receive signal of the signal processing apparatus in the radar is inversely proportional to the fourth power of a distance. Thus, the quantization loss becomes a major problem only when distant and too weak radar receive signals are processed.

Figure 12:
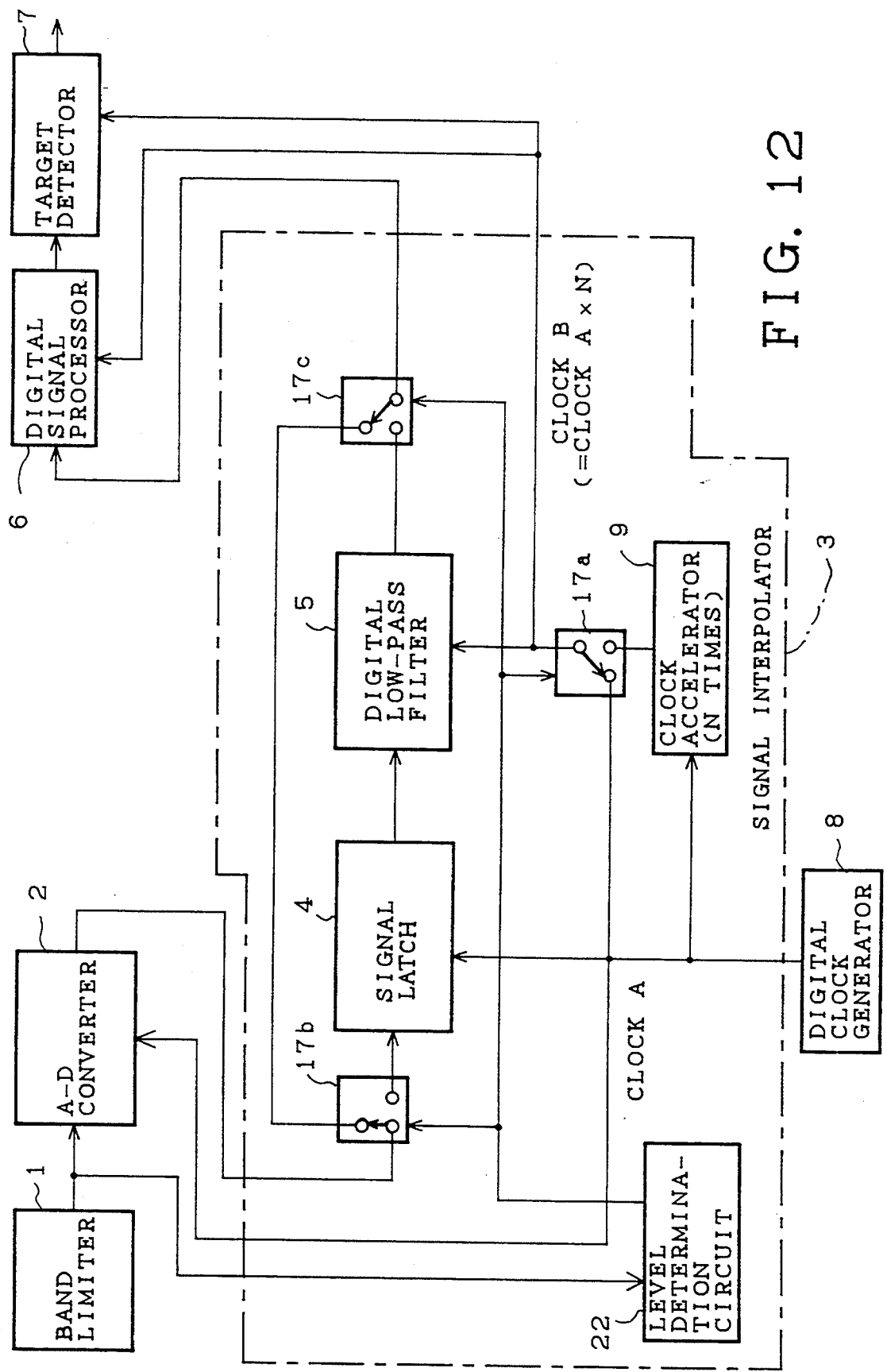
FIG. 12 is a block diagram showing a configuration of a signal processing apparatus in a radar according to the fifth embodiment of the present invention.

It is possible to reduce entire processing load in the apparatus by utilizing such a characteristic of the radar receive signal, and using a normal operation by the clock signal A and a high speed operation by the clock signal B as desired. FIG. 12 is a block diagram showing a configuration of a signal processing apparatus obtained by adding a switching circuit for the clock signal A and the clock signal B to the signal processing apparatus according to the embodiment 1 as shown in FIG. 5.

In FIG. 12, reference numeral 17a means a clock signal changing switch to cause the clock signal A and the clock signal B to be switched over from one to another according to a switch control signal, and 17b and 17c mean bypass changing switches to bypass the signal latch 4 and the digital low-pass filter 5. Reference numeral 22 means a level determination circuit of the radar receive signal to output the switch control signal to the clock signal changing switch 17a and the bypass changing switches 17b and 17c when a receive level of the radar receive signal crosses a predetermined level.

A description will now be given of the operation. The level determination circuit 22 decides whether or not the receive level of the radar receive signal is greater than the predetermined level. In case the receive level of the radar receive signal is greater than the predetermined level, the level determination circuit 22 feeds the switch control signal to the clock signal changing switch 17a such that the clock signal A is fed to the digital low-pass filter 5, the digital signal processor 6 and the target detector 7. Further, the level determination circuit 22 feeds the switch control signal to the bypass changing switches 17b, 17c so as to bypass the signal holer 4 and the digital low-pass filter 5.

Figure 1:
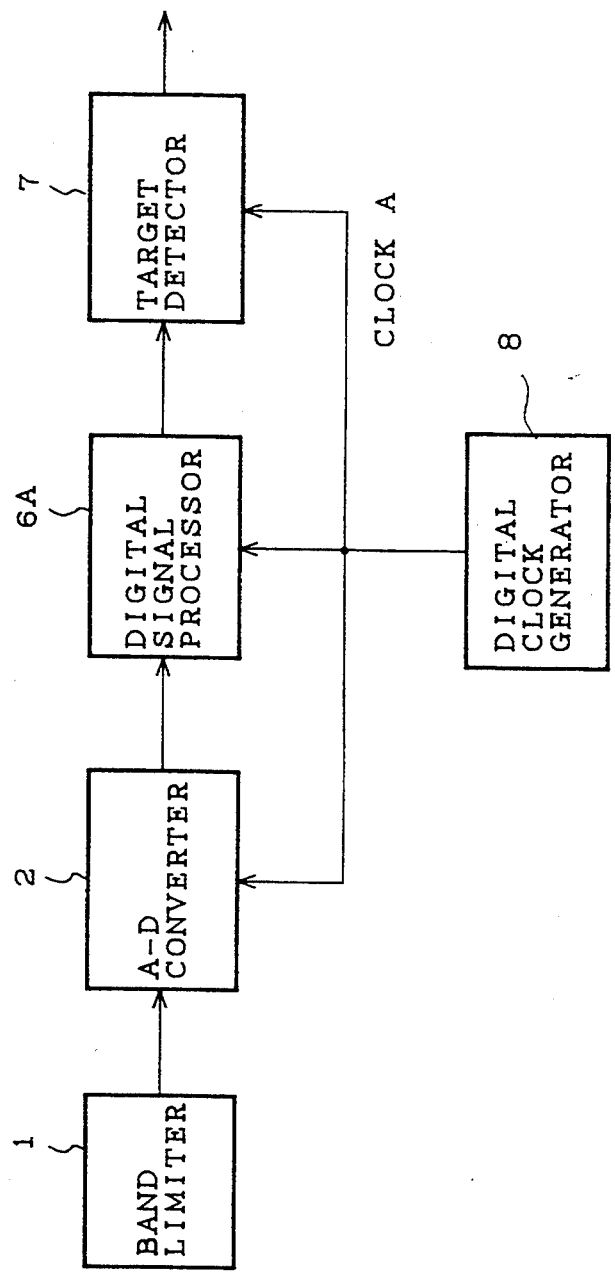
FIG. 1 is a block diagram showing a configuration of a signal processing apparatus in a conventional radar.

That is, the digital clock generator 8 feeds the clock signal A to all the digital circuits such as the A-D converter 2, the target detector 7, and the digital signal processor 6 while the signal latch 4 and the digital low-pass filter 5 are bypassed by the bypass changing switches 17b, 17c. Accordingly, the signal processing apparatus is operated as in the case of the conventional signal processing apparatus shown in FIG. 1.

When a distant and weak radar receive signal is received, the level determination circuit 22 decides that the receive level of the radar receive signal is less than the predetermined level. Consequently, the level determination circuit 22 feeds the switch control signal to the clock signal changing switch 17a such that the clock signal B is fed to the digital low-pass filter 5, the digital signal processor 6 and the target detector 7. Further, the level determination circuit 22 feeds the switch control signal to the bypass changing switches 17b, 17c such that the signal holer 4 and the digital low-pass filter 5 exist on a signal processing path.

Therefore, it is possible to feed the clock signal B having a frequency which is N times a frequency of the clock signal A to the digital low-pass filter 5, the digital signal processor 6, and the target detector 7. In this condition, as in the embodiment 1, the radar receive signal is interpolated by passing through the signal holer 4 and the digital low-pass filter 5 in the signal interpolator 3. As a result, it is possible to reduce a time quantization loss.

Embodiment 6

Figure 13:
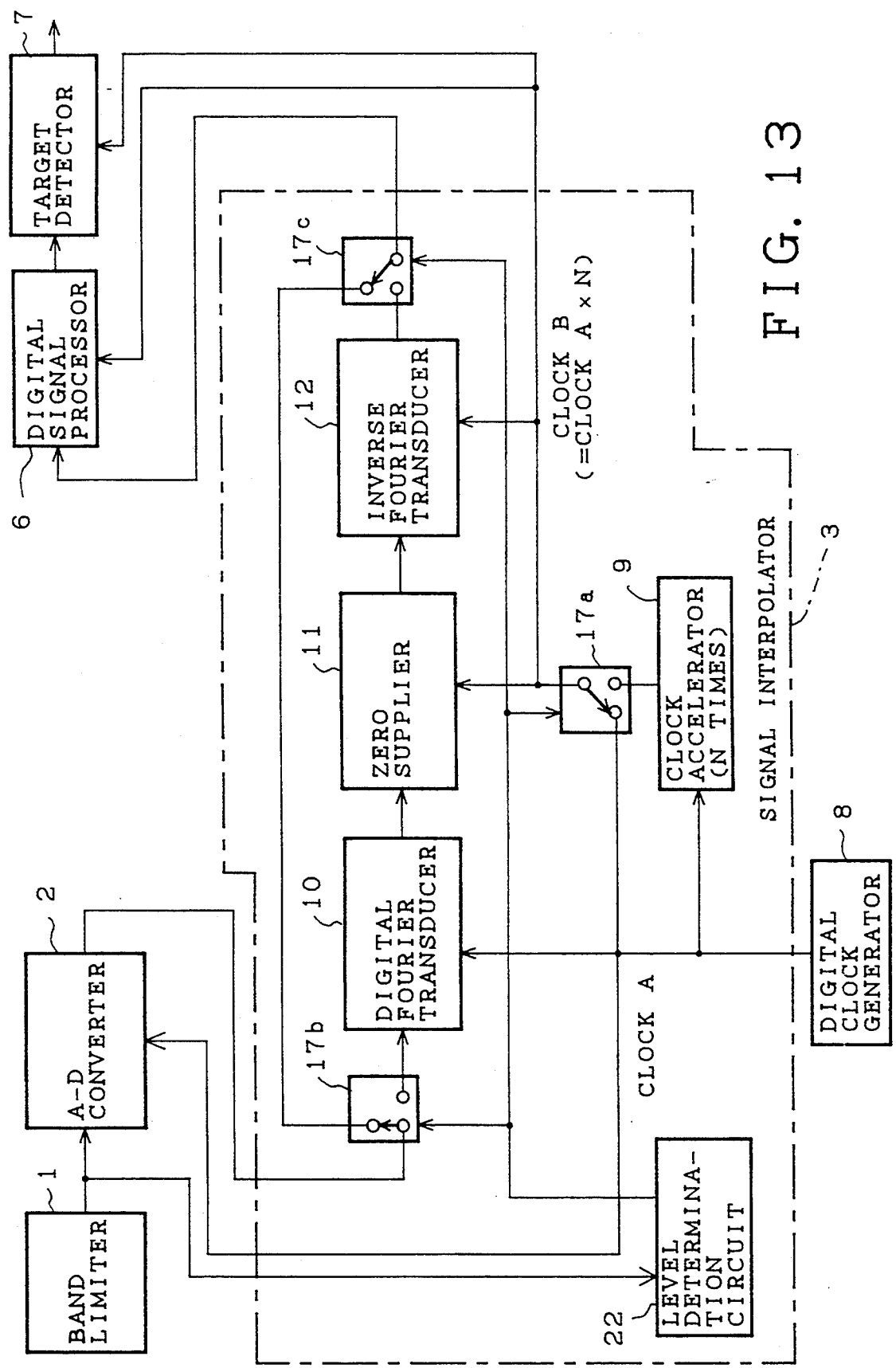
FIG. 13 is a block diagram showing a configuration of a signal processing apparatus in a radar according to the sixth embodiment of the present invention.

FIG. 13 is a block diagram showing a configuration of a signal processing apparatus obtained by adding a switching circuit for a clock signal A and a clock signal B to the signal processing apparatus according to the embodiment 2 as shown in FIG. 7. A clock signal changing switch 17a, bypass changing switches 17b, 17c, and a level determination circuit 22 are identical with those shown in FIG. 12. However, in this case, the bypass changing switches 17b, 17c are used to bypass a digital Fourier transducer 10, a zero supplier 11, and an inverse Fourier transducer 12.

A description will now be given of the operation. The level determination circuit 22 decides whether or not the receive level of the radar receive signal is greater than the predetermined level. In case the receive level of the radar receive signal is greater than the predetermined level, the level determination circuit 22 feeds a switch control signal to the clock signal changing switch 17a such that the clock signal A is fed to the zero supplier 11, the inverse Fourier transducer 12, the digital signal processor 6, and the target detector 7. Further, the level determination circuit 22 feeds the switch control signal to the bypass changing switches 17b, 17c so as to bypass the digital Fourier transducer 10, the zero supplier 11, and the inverse Fourier transducer 12.

Therefore, the digital clock generator 8 feeds the clock signal A to all the digital circuits such as the A-D converter 2, and the target detector 7 while the digital Fourier transducer 10, the zero supplier 11, and the inverse Fourier transducer 12 in the signal interpolator 3 are bypassed. In this condition, the signal processing apparatus is operated as in the case of the conventional signal processing apparatus shown in FIG. 1.

When a distant and weak radar receive signal is received, the level determination circuit 22 decides that the receive level of the radar receive signal is less than the predetermined level. Consequently, the level determination circuit 22 feeds the switch control signal to the clock signal changing switch 17a such that the clock signal B is fed to the zero supplier 11, the inverse Fourier transducer 12, the digital signal processor 6 and the target detector 7. Further, the level determination circuit 22 feeds the switch control signal to the bypass changing switches 17b, 17c such that the digital Fourier transducer 10, the zero supplier 11, and the inverse Fourier transducer 12 exist on a signal processing path.

Therefore, it is possible to feed the clock signal B having a frequency which is N times a frequency of the clock signal A to the zero supplier 11, the inverse Fourier transducer 12, the digital signal processor 6, and the target detector 7. Further, as in the embodiment 2, the radar receive signal is interpolated by passing through the digital Fourier transducer 10, the zero supplier 11, and the inverse Fourier transducer 12 in the signal interpolator 3. As a result, it is possible to reduce a time quantization loss.

Embodiment 7

Figure 14:
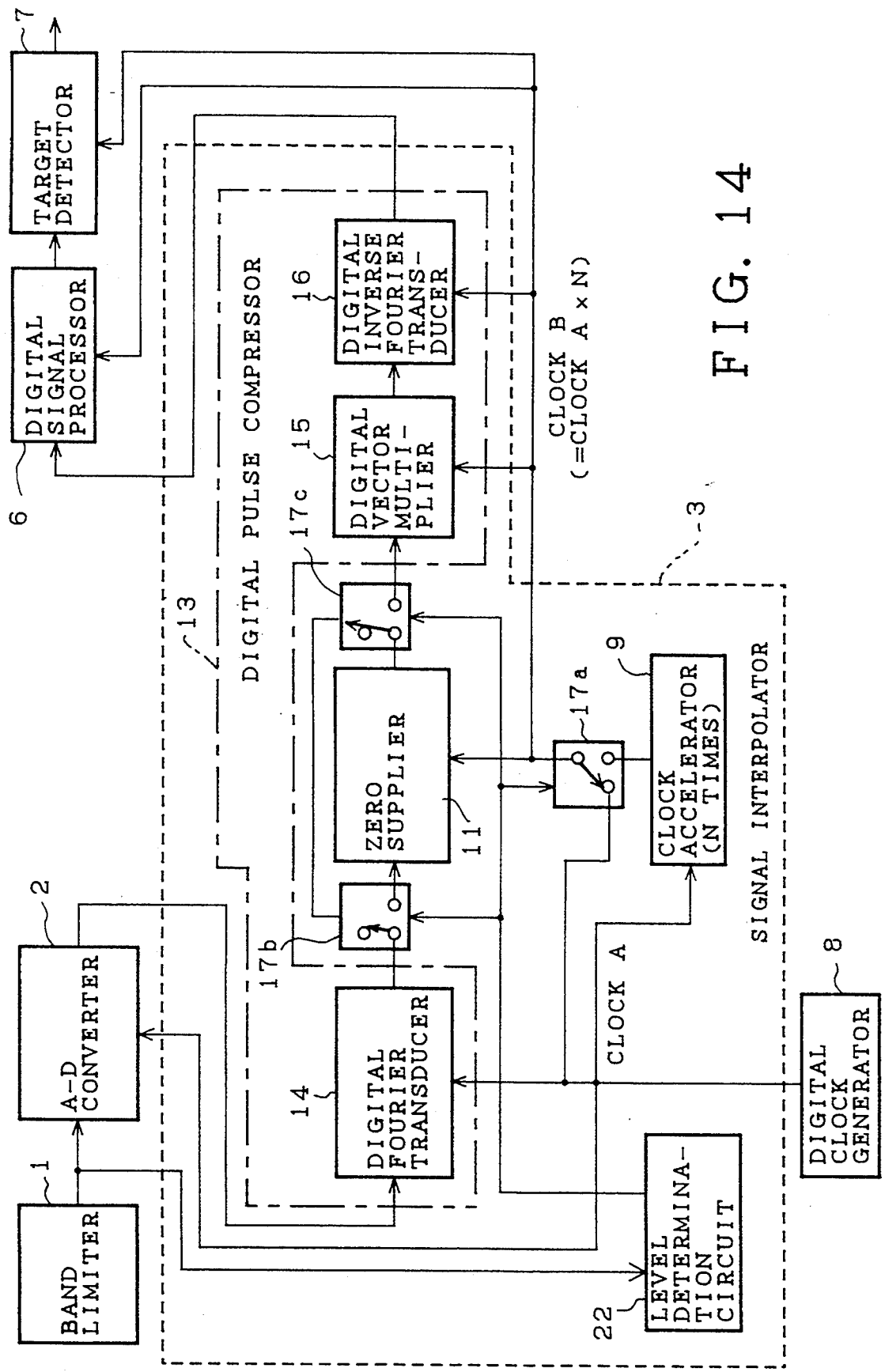
FIG. 14 is a block diagram showing a configuration of a signal processing apparatus in a radar according to the seventh embodiment of the present invention.

FIG. 14 is a block diagram showing a configuration of a signal processing apparatus obtained by adding a switching circuit for a clock signal A and a clock signal B to the signal processing apparatus according to the embodiment 3 as shown in FIG. 9. A clock signal changing switch 17a, a bypass changing switches 17b, 17c, and a level determination circuit 22 are identical with those shown in FIG. 12. However, in this case, the bypass changing switches 17b, 17c are used to bypass a zero supplier 11.

A description will now be given of the operation. The level determination circuit 22 decides whether or not the receive level of the radar receive signal is greater than the predetermined level. In case the receive level of the radar receive signal is greater than the predetermined level, the level determination circuit 22 feeds a switch control signal such that the clock signal A is fed to the zero supplier 11, a digital inverse Fourier transducer 16, the digital signal processor 6, and the target detector 7. Further, the level determination circuit 22 feeds the switch control signal to the bypass changing switches 17b, 17c so as to bypass the zero supplier 11.

Therefore, the digital clock generator 8 feeds the clock signal A to all the digital circuits such as the A-D converter 2, and the target detector 7 while the zero supplier 11 in the signal interpolator 3 is bypassed. In this condition, the signal processing apparatus is operated as in the case of the conventional signal processing apparatus.

When a distant and weak radar receive signal is received, the level determination circuit 22 decides that the receive level of the radar receive signal is less than the predetermined level. Consequently, the level determination circuit 22 feeds the switch control signal to the clock signal changing switch 17a such that the clock signal B is fed to the zero supplier 11, the digital inverse Fourier transducer 16, the digital signal processor 6, and the target detector 7. Further, the level determination circuit 22 feeds the switch control signal to the bypass changing switches 17b, 17c such that the digital Fourier transducer 10, and the zero supplier 11 exist on a signal processing path.

That is, it is possible to feed the clock signal B having a frequency which is N times a frequency of the clock signal A to the zero supplier 11, the digital inverse Fourier transducer 16, the digital signal processor 6, and the target detector 7. In this condition, as in the embodiment 3, the radar receive signal is interpolated by passing through the zero supplier 11, and the digital inverse Fourier transducer 16 in the signal interpolator 3. As a result, it is possible to reduce a time quantization loss.

Embodiment 8

FIG. 15 is a block diagram showing a configuration of a signal processing apparatus obtained by adding a switching circuit for a clock signal A and a clock signal B to the signal processing apparatus according to the embodiment 4 as shown in FIG. 10. In this case, the digital Fourier transducer 19 includes a portion 19A to perform the Fourier transform with respect to only a receive signal, and a portion 19B to perform the Fourier transform at an M×N point together with the digital Fourier transducer 19A. The maximum value selector 20 includes a portion 20A to detect the maximum value in output from the digital Fourier transducer 19A, and a portion 20B cooperating with the maximum value selector 20A to detect the maximum value in output from the digital Fourier transducer 19. That is, the digital Fourier transducer 19 includes the digital Fourier transducer 19A and the digital Fourier transducer 19B, and the maximum value selector 20 includes the maximum value selector 20A and the maximum value selector 20B.

The clock signal changing switch 17a is provided to switch a clock which is fed to the zero supplier 11, the digital Fourier transducer 19, the maximum value selector 20, the digital signal processor 6 and the target detector 7. Further, a bypass changing switch 17b is provided to partially remove the digital Fourier transducer 19B from the digital Fourier transducer 19. The bypass changing switch 17c is provided to partially remove the maximum value selector 20B from the maximum value selector 20.

A description will now be given of the operation. The level determination circuit 22 decides whether or not the receive level of the radar receive signal is greater than the predetermined level. In case the receive level of the radar receive signal is greater than the predetermined level, the level determination circuit 22 feeds a switch control signal to the clock signal changing switch 17a such that the clock signal A is fed to the digital Fourier transducer 19A, the maximum value selector 20A, the digital signal processor 6, and the target detector 7. Further, the level determination circuit 22 feeds the switch control signal to the bypass changing switches 17b, 17c so as to remove the digital Fourier transducer 19B, and the maximum value selector 20B.

Therefore, the digital clock generator 8 feeds the clock signal A to all the digital circuits such as the A-D converter 2, and the target detector 7 while the zero supplier 11, the digital Fourier transducer 19B and the maximum value selector 20B in the signal interpolator 3 are removed. Further, as in the signal processing apparatus in the conventional radar, the Fourier transform at an M point can be performed.

When a distant and weak radar receive signal is received, the level determination circuit 22 decides that the receive level of the radar receive signal is less than the predetermined level. Consequently, the level determination circuit 22 feeds the clock signal changing switch 17a with the switch control signal to instruct switch changing. Subsequently, there is provided a condition where it is possible to feed the clock signal B having a frequency which is N times a frequency of the clock signal A to the zero supplier 11, the digital Fourier transducer 19, the digital signal processor 6, and the target detector 7. Further, the level determination circuit 22 feeds the bypass changing switches 17b, 17c with the switch control signal to instruct the switch changing. Then, the digital Fourier transducer 19B is connected as a component part of the digital Fourier transducer 19, and the maximum value selector 20B is connected as a component part of the maximum value selector 20. In this condition, as in the case of the embodiment 4, the zero supplier 11 supplements a zero value, and performs the Fourier transform at the M×N point. As a result, it is possible to reduce a time quantization loss.

While preferred embodiments of the invention have been described using specific terms, such description is for illustrative purposes only, and it is to be understood that changes and variations may be made without departing from the spirit or scope of the following claims.

What is claimed is:

1. A signal processing apparatus in a radar including an A-D converter to sample and digitize a radar receive signal whose band is limited by using a first clock having a predetermined frequency, and a target detector to detect a target in a digital signal to which digital signal processing such as MTI processing is performed, said signal processing apparatus comprising:
    a clock accelerator to generate a second clock signal having a frequency which is N times (N: integer) a frequency of said first clock signal;
    a signal latch to hold an output from said A-D converter while N second clocks are outputted; and
    a digital low-pass filter operated by said second clock signal to pass a signal having frequency which is not higher than Nyquist frequency in output from said signal latch, and feed a signal whose frequency is limited to a terminal of said target detector, and said target detector being operated by said second clock.

2. A signal processing apparatus in a radar according to claim 1, further comprising:
    a clock signal changing switch to cause an operating clock signal fed to said signal latch, said digital low-pass filter, and said target detector to be switched over to either said first clock or said second clock;
    a bypass changing switch to bypass said signal latch and said digital low-pass filter; and
    a level determination circuit to perform switching control of said clock signal changing switch and said bypass changing switch according to a receive level of a radar receive signal.

3. A signal processing apparatus in a radar including an A-D converter to sample and digitize a radar receive signal whose band is limited by using a first clock having a predetermined frequency, and a target detector to detect a target in digital signals to which digital signal processing such as MTI processing is performed, said signal processing apparatus comprising:
    a clock accelerator to generate a second clock signal having a frequency which is N times (N: integer) a frequency of said first clock signal;
    a digital Fourier transducer to perform the Fourier transform of a digitized signal from said A-D converter;
    a zero supplier operated by said second clock signal to supplement output from said digital Fourier transducer with zero values so as to multiply said output value by N; and
    an inverse Fourier transducer operated by said second clock signal to perform the inverse Fourier transform of output from said zero supplier so as to feed said inverse Fourier transform output to a terminal of said target detector, and said target detector being operated by said second clock.

4. A signal processing apparatus in a radar according to claim 3, further comprising:
    a clock signal changing switch to cause an operating clock signal fed to said zero supplier, said inverse Fourier transducer, and said target detector to be switched over to either said first clock or said second clock;
    a bypass changing switch to bypass said digital Fourier transducer, said zero supplier, and said inverse Fourier transducer; and
    a level determination circuit to perform switching control of said clock signal changing switch and said bypass changing switch according to a receive level of a radar receive signal.

5. A signal processing apparatus in a radar including an A-D converter to sample and digitize a radar receive signal whose band is limited by using a first clock having a predetermined frequency, and a target detector to detect a target in digital signals to which digital signal processing such as MTI processing is performed, said signal processing apparatus comprising:
    a clock accelerator to generate a second clock signal having a frequency which is N times (N: integer) a frequency of said first clock signal;
    a digital Fourier transducer to perform the Fourier transform of a digitized signal from said A-D converter;
    a zero supplier operated by said second clock signal to supplement output from said digital Fourier transducer with zero values so as to multiply said output value by N;

a digital vector multiplier to perform vector multiplication of output from said zero supplier and pulse compression factor; and a digital inverse Fourier transducer to perform the inverse Fourier transform of output from said digital vector multiplier so as to feed the inverse Fourier transform output to a terminal of said target detector, said digital Fourier transducer, said digital vector multiplier and said digital inverse Fourier transducer also serving as component parts of a pulse compression apparatus in said radar, and said target detector being operated by said second clock.

6. A signal processing apparatus in a radar according to claim 5, further comprising:

a clock signal changing switch to cause an operating clock signal fed to said zero supplier, said digital inverse Fourier transducer and said target detector to be switched over to either said first clock or said second clock;

a bypass changing switch to bypass said zero supplier; and a level determination circuit to perform switching control of said clock signal changing switch and said bypass changing switch according to a receive level of a radar receive signal.

7. A signal processing apparatus in a radar including an A-D converter to sample and digitize a radar receive signal whose band is limited by using a first clock having a predetermined frequency, each hit interval delayer to sequentially provide output from said A-D converter with delay corresponding to a pulse repetition period, a digital Fourier transducer to perform the Fourier transform of output from said each hit interval delayer, a maximum value selector to detect the maximum value in each output from said digital Fourier transducer, and a target detector to detect a target in a digital signal to which digital signal processing such as MTI processing is performed, said signal processing apparatus comprising:

a clock accelerator to generate a second clock signal having a frequency which is N times (N: integer) a frequency of said first clock signal; and a zero supplier to supplement output from said each hit interval delayer with zero values to magnify the output up to N times the total number of the output from said hit delayer, and said target detector being operated by said second clock.

8. A signal processing apparatus in a radar according to claim 7, further comprising:

a clock signal changing switch to cause an operating clock signal for said digital Fourier transducer, said maximum value selector, said zero supplier, and said target detector to be switched over to either a first clock or a second clock;

an operation changing switch to cause the number input into said digital Fourier transducer and said maximum value selector to be switched over to either a number identical with said total number of said output from said hit interval delayer or N times the number; and a level determination circuit to perform switching control of said clock signal changing switch and said operation changing switch according to a receive level of a radar receive signal.

* * * * *